April 2, 1940.  C. LOSE, JR  2,195,415
FILTER BED CLEANING
Filed July 26, 1938
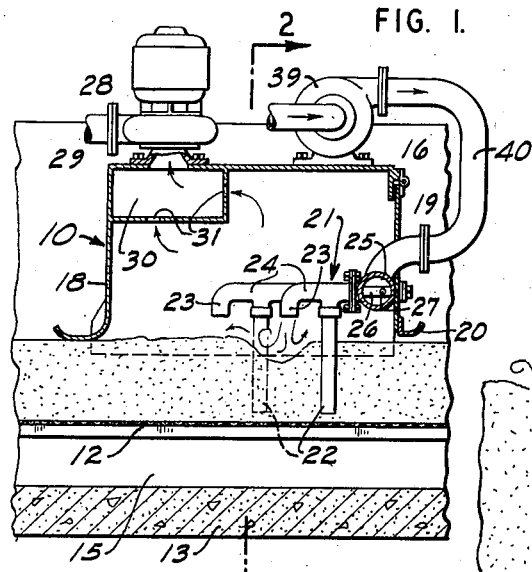
FIG. 1.
FIG. 2.
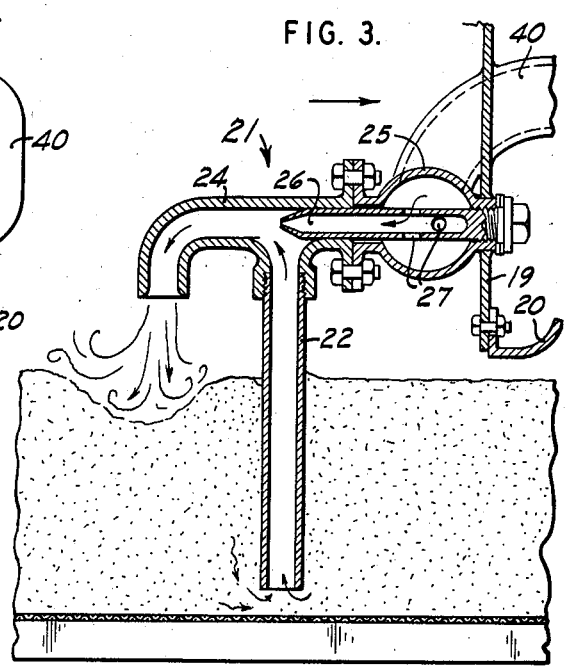
FIG. 3.
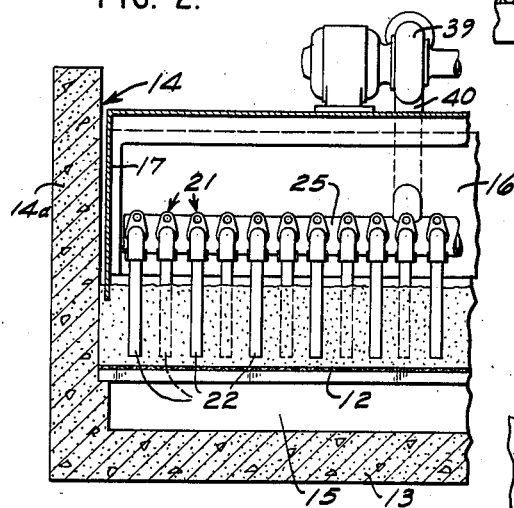
FIG. 4.
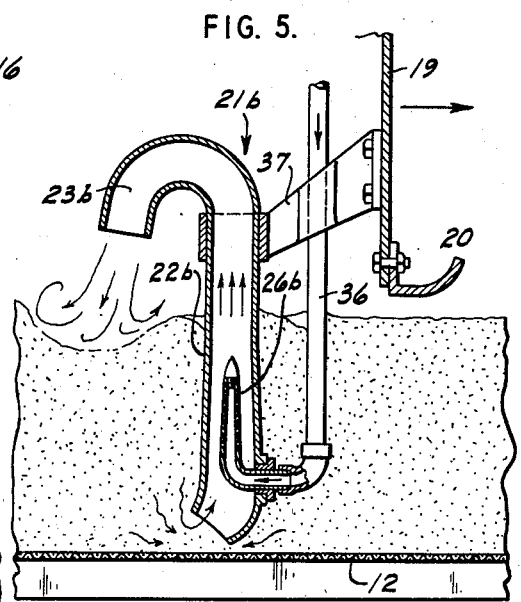
FIG. 5.
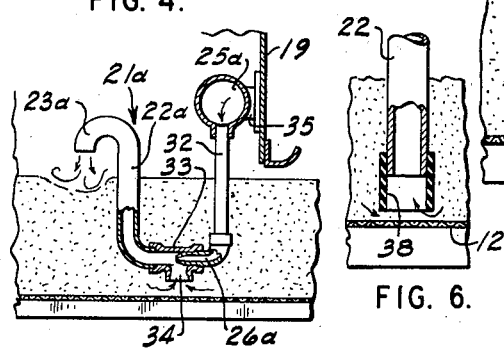
FIG. 6.
INVENTOR
CHARLES LOSE, JR.
BY
ATTORNEY Patented Apr. 2, 1940

2,195,415

UNITED STATES PATENT OFFICE 2,195,415

FILTER BED CLEANING

Charles Lose, Jr., Cranford, N. J.

Application July 26, 1938, Serial No. 221,382

7 Claims. (Cl. 210—128)

This invention relates to filter bed cleaning in filtration of liquids and more particularly to filter bed cleaning means adapted to travel along the upper face of a downward flow filter bed of granular material, such for example as sand, and remove the accumulated solids.

Heretofore it has been the practice in certain filtration plants, to maintain filter beds of granular material, such as sand, in continuous operation by the use of overhead cleaning devices which are shifted from one portion of the filter bed to another to enable part of the bed to be cleaned while the rest of the bed is in regular use. Particularly in sewage purification, the sewage is fed to a settling tank in which a large proportion of the solids are removed by settling and the supernatant liquid is passed through a filter bed of granular material.

In some of such prior installations, the settling tank is of the type in which the settled solids constituting sludge, are fed to a central outlet at the bottom of the tank and the supernatant liquid is passed into a channel extending along the periphery of the settling tank. This channel is provided with a filter bed of suitable granular material separating the channel into an upper portion receiving the supernatant liquid and a lower portion or chamber in which the filtered sewage or liquid collects and from which it is discharged from the apparatus.

The cleaning of the filter bed is effected in many instances by a cleaning device which travels around the channel and removes the accumulated solids from the filter and discharges them with the accompanying liquid back into the settling tank for further removal to as great an extent as possible, by settling. In some of such prior cleaners, each cleaner comprises a caisson or chamber open at the bottom and resting on the top of the filter bed, hollow fingers projecting from the chamber downwardly into the bed and acting to stir up the filter bed during the travel of the cleaner, means for forcing fluid through said hollow fingers to loosen by jet action the waste material in the filter bed, and means for withdrawing dirty water from the surface and interior of the filter bed and then from the chamber and discharging it outside the chamber. When jets of fluid, such as water are discharged from the lower parts of the hollow fingers, they stir up the granular material of the filter bed and in some cases actually carry some of the waste solids downwardly through the usual screen support of the filter bed so that they pass away with the filtrate. In other installations, there has been agitation of the material of the filter bed but no jet action by fluid and for withdrawal of the dirty water from the filter bed dependence has been placed on the means for withdrawing dirty water from the caisson or chamber and the results have not been satisfactory in producing efficient cleaning.

The main object of the present invention is to provide for improved filter bed cleaning in a novel and advantageous manner. Another object of the invention is to provide for improved filter bed cleaning by which the aforesaid disadvantages will be obviated. Another object of the invention is to provide for raising granular material from the bottom of the filter bed and depositing it on the top of the bed while maintaining the bed in condition for filtration, washing the material during this transfer and removing from the space above the portion of the filter bed being cleaned, dirty water containing waste solids separated from the granular filter bed material.

In carrying out the invention according to a preferred form, use may be made of a movable cleaner comprising a caisson or chamber having an open bottom and engaging the filter bed so as to effect a close seal with said bed at the sides and rear of the chamber, the lower edge of the front wall of the chamber being somewhat higher so that the solids collected on the surface of the filter bed together with a limited amount of liquid, may pass beneath the front wall into the interior of the chamber. Dirty water brought into the chamber in this way and dirty water separated from granular material of the filter bed beneath the chamber may be discharged from the chamber by any suitable means. To withdraw the collected solids from the interior of the bed, the granular material from the bottom of the filter bed may be passed upwardly through suitable ducts and, after a cleaning effected during this passage, may be discharged upon the surface of the filter bed, thus tending to fill up the depression caused by settling of the material over areas at the bottom of the filter bed from which material has been removed. The lifting of the filter bed material and dirty water from the bottom of the filter bed to the interior of the chamber above the bed may be effected by any suitable means but preferably is effected by agitating devices moved through the filter bed material to agitate it, each device having a transfer passage extending from the lower part of the bed to the top thereof, and suitable means such as fluid jet pumps of which there is one for each of the devices. In one form, each jet may act through a horizontal passage at the upper end of each of said transfer passages and, after drawing the granular material together with dirty water up through the hollow tooth, then discharge it so that it will settle on the top of the filter bed. Preferably the upper end of each of said transfer passages is turned downwardly toward the filter bed to direct the granular material toward the bed and separate the sand from the dirty water.

In the form just described, the jet producing the pumping action is located above the filter bed. Each jet performing the pumping action may, however, be located in a horizontal position near the bottom of the filter bed and force filter bed material and dirty water into the lower end of the corresponding transfer passage.

According to another form of the invention, each jet may be located in the lower part of a corresponding transfer passage and directed upwardly so as to carry the filter bed material and dirty water upwardly through the corresponding transfer passage.

Although the agitating devices may be arranged in alignment across the chamber, it may be desirable to separate them into rows in which the devices of successive rows are staggered thus tending to minimize their effect in tending to move the filter bed material forward with the teeth.

Other features, objects and advantages will appear upon consideration of the following detailed description and of the drawing, in which:

Fig. 1 is a fragmentary view, partly in section, illustrating a preferred embodiment of the cleaner in position relative to a filter bed;

Fig. 2 is a section taken along the line 2—2 of Fig. 1;

Fig. 3 is a view on an enlarged scale including a section of one of the devices shown in Fig. 1;

Fig. 4 is a view similar to Fig. 3 but showing a modification;

Fig. 5 is a sectional view similar to Fig. 3 but showing a second modification; and Fig. 6 is a fragmentary section showing a yieldable tip on the lower end of the device shown in Fig. 3.

Referring to Figs. 1 and 2, a filter bed cleaner 10 embodying a preferred form of the present invention is illustrated in connection with a filter bed 11 of suitable granular material, such as sand, resting on a support or screen 12. The support 12 is spaced from the bottom 13 of the channel or tank 14 containing the filter bed so as to provide a filtered liquid compartment or chamber 15 from which the liquid may be discharged as desired. It should be understood that the cleaner 10 preferably extends completely across the channel or tank 14 of which only the bottom 13 and one side wall 14a are shown. The channel 14 may be annular in shape and extend around a settling tank (not shown), an arrangement in considerable use for combined settling and filtration. The cleaner 10 may be moved along the channel 14 by any suitable means.

The filter bed cleaner 10 may comprise a caisson or chamber 16 open at its bottom which rests upon the filter bed 11. The chamber 16 has side walls 17 engaging the filter bed 11 to effect a substantial seal therewith, a rear wall 18 curved rearwardly and upwardly at its lower edge to smooth the part of the filter bed just cleaned and to maintain an effective seal with the upper surface of the filter bed, and a front wall 19 with its lower edge at a higher level to enable entry into the chamber 16 of waste solids accumulated on the top of the filter bed, while acting to maintain a suitable seal. Preferably, the lower edge of the front wall is provided with a forwardly extending lip 20 upturned at its forward edge to guide and depress the waste solids so that they will pass under said lower edge of the forward wall.

As viewed in Fig. 1, the cleaner 10 moves to the right. During such movement waste solids on the surface of the filter bed 11 together with some liquid enter the chamber 16 under the front wall 19 and solids and liquid from the filter bed 11 enter the caisson through devices 21, which project downwardly to the lower part of the filter bed and serve to agitate the granular material. The devices 21 may, as long as they take care of all material throughout the width of the channel 14, be arranged in any suitable manner. Preferably said devices 21 are arranged in a plurality of rows extending across the caisson 16 and channel 14 and are in staggered positions in successive rows.

Each of the devices 21 is provided with passages having an open lower end near the bottom of the device and a discharge end above the surface of the bed and the granular material, such as sand, at the bottom of the filter bed is transferred or passed upwardly through this passage by any suitable means and discharged above the top of the bed. The transfer of the granular material from the bottom to the top of the filter through said transfer passages may be effected by any suitable means. In the specific embodiment of the invention illustrated in Figs. 1, 2 and 3, the granular material, such as sand, together with waste solids and dirty water, is passed upwardly through hollow teeth 22 in the form of pipes and discharged into the caisson through downwardly turned spouts 23. These spouts 23 might be extensions of the hollow teeth 22 but are here shown as the downturned ends of horizontal pipes 24 connected at their lower sides with the upper ends of the hollow teeth 22.

Preferably, the lifting of material from the bottom of the bed 11 is effected by means of fluid jet pumps utilizing fluid, such as water or compressed air, supplied from a manifold 25 through jets or jet pipes 26 coaxial with the horizontal pipes 24 and discharging into these pipes 24 at suitable points, for example just above the upper ends of the pipes or hollow teeth 24. As illustrated, the horizontal pipes 24 are connected directly with the manifold 25 and the manifold is supported from the forward wall 19 of the caisson by means of the jet pipes 26 which extend across the interior of the manifold and through the connections between the manifold and the horizontal pipes so as to prevent passage of the fluid around the jet pipes. The jet pipes 26 are closed at their ends opposite their nozzles and may receive fluid from the manifold through openings or ports 27 in the sides thereof.

The action of the fluid through the jet pipes 26 maintains through the pipes or teeth 24 an upward flow originating at the lower ends of the pipes where they are surrounded by saturated sand or other suitable material. The sand, waste solids and dirty water are ejected from the downturned nozzles and the sand which has been washed and scoured during its travel through the pipes is again deposited on the top of the filter bed. The sand is also washed during its passage from the nozzles to the bed and there may also be washing of the sand at the top of the bed. The dirty water collecting in the caisson 16 may be withdrawn in any suitable manner, as by means of a pump 28 discharging through a pipe 29 dirty water drawn from a compartment 30 in the upper part of the caisson 16 and connected with the interior thereof by openings or ports 31.

It will be apparent that as the caisson 16 advances, the surface of the filter bed just to the rear of the devices 21 will tend to sink and that, if the sand raised from the bottom of the filter bed is deposited to the rear of said devices 21 by rearwardly directed spouts 23, the cleaned sand will tend to restore the bed to its original thickness.

Although two rows of devices 21 have been shown as arranged at the rear of the manifold 25, the arrangement may obviously be changed as by placing one row in front of the manifold and the other to the rear.

In the modification illustrated in Fig. 4, each agitating and sand lifting device 21a has an upright pipe 22a in the lower end of which sand and dirty water from the lower part of the bed is forced by means of a jet pipe 26a connected with a manifold 25a by pipes 32. The jet pipes 26a extend into members 33 having at their bottoms inlets 34 and connected at their ends opposite the jet pipes 26a with the lower ends of the pipes 22a. At their upper ends, the pipes 22a discharge through downwardly turned spouts 23a which in this form may be integral with the upright pipes 22a. The manifold 25a may be supported from the front wall 19 of the caisson by suitable means such as brackets 35. It will be apparent that, although the pipes 32 also serve to stir up and agitate the same, the action of this modified structure will be substantially the same as that of the corresponding structure shown in Figures 1, 2 and 3.

As illustrated in Fig. 5 the second modification comprises an upright pipe 22b having at its upper end a downwardly turned spout 23b. In this form of invention, the material is lifted or passed through each upright pipe 22b by means of an upwardly turned nozzle 26b which provides a very efficient form of fluid lift. Fluid under pressure may be supplied to each nozzle 26b through a pipe 36 connected at its upper end to a suitable manifold (not shown) and at its lower end to the nozzle 26b through a connection passing through the side wall of the pipe 22b. The upright pipes 22b may be supported from the front wall 19 of the caisson in any suitable manner as by means including brackets 37.

To avoid any danger of the striking of the lower ends of the hollow teeth or pipes 21 of the form shown in Figs. 1, 2 and 3 on the support 12 for the filter bed or any means for holding the support 12 in place, the lower end of each tooth 21 may be supplied with a flexible or yieldable tip 38 as shown in Fig. 6. Similar provisions may be made for the forms of sand transferring devices shown in Figs. 4 and 5. Fluid under pressure may be supplied to the manifold 25 of Figs. 1, 2 and 3 by means of a pump 39 mounted on the top of the caisson 16 and having its discharge connected with the manifold 25 by means of a pipe 40.

In practice it has been found that, when the flow of fluid through the various jet devices is cut off, there is a reverse flow from the caisson to the bottom of the filter bed, thus contaminating the material of the filter bed and permitting the passage of dirty fluid to the chamber beneath the screen 12. This difficulty may be met in any suitable manner as by providing a check valve at the caisson side of each jet device.

It should be understood that various modifications and changes may be made and that various features may be used without others without departing from the true scope and spirit of the invention.

What I claim is:

1. A filter bed cleaner adapted for movement over the granular bed of a downward flow filter for liquids, comprising a caisson to cooperate with the upper surface of said bed, a plurality of devices extending downwardly to the lower part of the filter bed beneath the caisson, each of said devices having a passage with an inlet at its bottom and an outlet above the upper surface of the bed, means for passing granular material and dirty liquid from the filter bed upwardly through said passages and discharging them into said caisson, and means for discharging dirty liquid from the caisson.

2. A filter bed cleaner adapted for movement over the granular bed of a downward flow filter for liquids, comprising a caisson to cooperate with the upper surface of said bed, a plurality of devices extending downwardly to the lower part of the filter bed beneath the caisson, each of said devices having a passage with an inlet at its bottom and an outlet above the upper surface of the bed, fluid jet pumping means for passing granular material and liquid from the filter bed upwardly through said passages and discharging them into said caisson, and means for discharging dirty liquid from the caisson.

3. A filter bed cleaner adapted for movement over the granular bed of a downward flow filter for liquids, comprising a caisson to cooperate with the upper surface of said bed, a plurality of devices extending from the caisson downwardly to the lower part of the filter bed, each of said devices having an upwardly extending passage with an inlet at its lower end and a cross passage extending across the top of the upwardly extending passage and adapted to discharge into said chamber above the filter bed, a fluid jet in said cross passage acting to draw granular material and dirty liquid up through the corresponding passage and discharge it into the caisson, and means for discharging dirty liquid from said caisson.

4. A filter bed cleaner adapted for movement over the granular bed of a downward flow filter for liquids, comprising a caisson to cooperate with the upper surface of said bed, a plurality of devices extending downwardly to the lower part of the filter bed, each of said devices having a passage with a downwardly extending lower part having an inlet at its lower end, an upper part extending upwardly to a level above the upper surface of the filter bed, and a generally horizontal intermediate part connecting the upper end of said lower part and the lower end of said upper part, a fluid jet device in said intermediate part adapted to cause an upward flow of granular material through said passage from the bottom of the filter bed to the caisson for discharge on the upper surface of the bed of granular material from the lower part of said bed.

5. A filter bed cleaner adapted for movement over the granular bed of a downward flow filter for liquids, comprising a caisson to cooperate with the upper surface of said bed, a plurality of devices extending downwardly from the caisson to the lower part of the filter bed, each of said devices having a passage extending upwardly from an inlet near the bottom of the filter bed to a level above the upper surface of the filter bed and discharging into the caisson, an upwardly directed fluid jet device in the upwardly extending passage for effecting a flow of granular material from the bottom of the filter bed to the upper part thereof and a cleaning of such material, and means for withdrawing dirty liquid from the caisson.

6. A device for use with the caisson of a traveling filter bed cleaner in cleaning granular material in use in a filter bed, said device comprising a structure having a passage extending from the bottom of the filter bed to the level above the upper surface and having a generally horizontal portion in the upper part thereof, and means including a horizontally disposed fluid jet in said horizontal portion of said passage for pumping granular material from the bottom of said bed and discharging it on the upper surface of the bed.

7. A device for use with the caisson of a traveling filter bed cleaner in cleaning granular material in use in a filter bed, said device comprising a structure having a passage extending from the bottom of the filter bed to a level above the upper surface and having a generally upright portion, and means including an upwardly directed fluid jet in said upright portion of said passage for drawing material from the bottom of said bed and discharging it on the upper surface thereof.

CHARLES LOSE, Jr.